UNITED STATES PATENT OFFICE.

CHARLES M. BROWN, OF TORONTO, ONTARIO, CANADA.

PROCESS OF RECOVERING POTASSIUM AND ALUMINUM FROM FELDSPAR.

1,402,831.

Specification of Letters Patent. Patented Jan. 10, 1922.

No Drawing. Application filed February 25, 1920. Serial No. 361,171.

*To all whom it may concern:*

Be it known that I, CHARLES M. BROWN, a subject of the King of Great Britain, and resident of the city of Toronto, county of York, Province of Ontario, in the Dominion of Canada, have invented certain new and useful Improvements in Processes of Recovering Potassium and Aluminum from Feldspar, described in the following specification.

This invention relates to a process or method of recovering potassium and aluminum found in feldspar and the principal objects of the invention are, to recover the maximum quantities of these materials at the minimum cost.

The principal feature of the invention consists in treating the feldspar at a moderate heat with sulphurous gases or sulphur dioxide $SO_2$, to effect a re-action and chemical change of the substances contained in the feldspar.

In carrying this process into operation the feldspar is first finely crushed and it is then placed in a rotary kiln, preferably of the type used in the manufacture of cement, at a low temperature. At the lower end of the kiln sulphurous gases produced in any desirable manner are admitted in such quantity as to effect a change of the potassium and aluminum present in the feldspar to sulphates.

Feldspar is a silicate of potassium and aluminum $AlKSi_3O_8$. Sulphur dioxid $SO_2$ or sulphurous gases united with oxygen when brought into contact with the feldspar forms sulphur trioxide $SO_3$ and sulphate of potassium $K_2SO_4$ and sulphate of aluminum $Al_2(SO_4)_3$ are thus formed.

Heat applied to the rotary kiln in carrying out this process is less than 1000° F., but the heat of reaction between the sulphur dioxide and the elements of the feldspar creates a chemical change of the desirable elements to sulphates. The product of the kiln is then leached in water and the liquor thus obtained is evaporated in order to recover the sulphates.

A process such as described is extremely simple, requires but the simplest form of apparatus and produces extraordinary results in the recovery of both potassium and aluminum.

What I claim as my invention is:—

1. A process of recovering potassium and aluminum from feldspar, consisting in subjecting the finely ground feldspar to the action of sulphurous gases in the presence of air in a heated atmosphere to effect a change of the potassium and aluminum compounds to sulphates, then leaching the product in water and evaporating the same to recover the salts.

2. A process for recovering potassium and aluminum from feldspar, consisting in heating at a temperature of less than 1000° F. finely ground feldspar within a rotary kiln, introducing at the lower end of said kiln sulphurous gases and air to produce $SO_3$ in sufficient quantity to ensure complete reaction with the potassium and aluminum compounds contained in the feldspar producing $K_2SO_4$ and $Al_2(SO_4)_3$ and leaching the product with water and withdrawing and evaporating the leaching liquid.

CHARLES M. BROWN.